United States Patent
Forche et al.

(10) Patent No.: US 6,171,032 B1
(45) Date of Patent: Jan. 9, 2001

(54) MECHANICALLY ACTUATED CHIP-LESS BORING HEAD FOR FORMING A HOLE IN A WORKPIECE

(75) Inventors: Thomas Leo Forche; Thomas Elwwod Moore, both of Adrian; Vern Charles Osenbaugh, Brooklyn; Erich James Vorenkamp, Pinckney, all of MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/298,445

(22) Filed: Apr. 23, 1999

(51) Int. Cl.[7] .................................................. B23B 47/00
(52) U.S. Cl. .................. 408/67; 83/565; 408/80; 408/204
(58) Field of Search ................... 408/67, 80, 204, 408/206; 83/565

(56) References Cited

U.S. PATENT DOCUMENTS

| | | |
|---|---|---|
| 3,941,358 | 3/1976 | Darling . |
| 4,173,913 | 11/1979 | Nicholson . |
| 4,283,044 | 8/1981 | McKibbin . |
| 5,193,596 | * 3/1993 | Patel .................................. 144/145 A |
| 5,458,444 | 10/1995 | Duncan . |
| 5,653,560 | 8/1997 | Weber . |
| 5,967,709 | * 10/1999 | Thuesen ................................ 408/204 |

* cited by examiner

Primary Examiner—A. L. Wellington
Assistant Examiner—Monica S. Carter
(74) Attorney, Agent, or Firm—Larry Shelton

(57) ABSTRACT

A cutting tool [10] for use in forming circular and non-circular holes in a workpiece [16] includes a boring shaft [12] that is rotatable about an axis [15] and a boring head [14] that is secured to the boring shaft [12]. A cutting blade [46] extends beneath the bottom surface of the boring head [14] and is spaced apart from the axis [15]. A slug pin [58] extends from the bottom surface of the boring body to pierce and retain the slug after it has been cut to prevent it from falling into the workpiece [16].

19 Claims, 2 Drawing Sheets

MECHANICALLY ACTUATED CHIP-LESS BORING HEAD FOR FORMING A HOLE IN A WORKPIECE

TECHNICAL FIELD

The present invention relates generally to a boring tool having a rotating cutting blade for forming a hole in a workpiece. More particularly, the present invention relates to a boring tool having a cutting blade for forming chip-less holes of either a circular or non-circular shape in a workpiece.

BACKGROUND ART

Various apparatus are known for use in boring and cutting holes through workpieces. Conventional boring apparatus typically include a rotating cutting head which moves along an axis and into contact with a portion of a workpiece. These apparatus include a cutting blade extending forwardly from the cutting head and disposed generally parallel to and spaced from the axis to perform the cutting operation. The blade is positioned such that the rotation of the cutting head moves the blade along a circular path in a plane perpendicular to the axis. The hole is formed by advancing the cutting head along the axis towards the workpiece as it is rotated, until the cutting blade is moved completely through the workpiece.

A significant disadvantage of conventional boring tools is that both the hole which is formed, and the waste slug or plug which is cut from the workpiece, have side edges generally parallel to the axis. As a result, the waste slug or plug often falls through the hole into the workpiece. This is particularly undesirable where the tool is used to form holes in blow molded hollow workpieces, such as vehicle fuel tanks or the like, as the plugs are difficult to retrieve and must be manually removed. In an effort to prevent the slugs from falling into the workpiece, attempts have been made to cut tapered holes, such as disclosed in U.S. Pat. No. 5,653,560. Such devices, however, are expensive and complex, have numerous moving parts, often require computer feedback, and utilize large areas of space.

The apparatus described above are further disadvantageous in that they only allow for the cutting of holes in workpieces that are uniform or circular in shape. While various apparatus and techniques are known for cutting non-circular or arbitrary shaped holes in workpieces, they also suffer from a variety of significant disadvantages. First, these current apparatus and techniques require expensive technologies to control the operation of the cutting blade, such as CNC machinery, robot manipulation or other motion control or laser cutting. Additionally, current technologies for cutting non-circular holes generate chips during the cutting process. This also increases the cost of the process as it requires a separate vacuum step to remove any debris that has accumulated in the workpiece. This process also significantly increases the amount of time and expense required to cut holes in the workpiece.

SUMMARY OF THE INVENTION

It is therefore an object of the present invention to provide a boring tool for forming a tapered hole in a workpiece to prevent the waste slug from falling through the hole into the workpiece thus requiring manual removal.

It is another object of the present invention to provide a boring tool for cutting non-uniform arbitrarily shaped holes in a workpiece that is less expensive than prior apparatus.

It is a further object of the present invention to provide an inexpensive and durable boring tool for cutting holes in a workpiece.

In accordance with the objects of the present invention, in one embodiment a boring tool for cutting non-uniform holes in a workpiece is provided. The tool includes a boring shaft that is rotatable about an axis and a boring head attached to the shaft. The boring head has a bottom surface beneath which the cutting blade extends. The boring head is surrounded by a stationary housing which is in communication with a pattern template. The pattern template has an inner periphery and an outer periphery with the inner periphery being tapered away from the axis as it extends from the workpiece toward the boring head. The inner periphery of the pattern template is also non-uniform in shape and engages a secant following cutter which is pivotably attached to the bottom surface of the boring head. The cutting blade which is secured to the bottom surface of the secant following cutter thus cuts a hole in the workpiece in the shape of the inner periphery.

In accordance with a further embodiment, a mechanical tool for boring tapered holes in a workpiece through removal of a slug is provided. The tool includes a boring shaft that is rotatable about an axis and a boring head attached to the shaft. The boring head has a bottom surface beneath which the cutting blade extends for contacting the workpiece. The cutting blade is disposed away from and at an angle with respect to the axis of rotation of the boring shaft. The tool also includes at least one surface probe extending beneath the surface of the boring head for contacting the workpiece. The surface probe is in communication with a linear slide to move the cutting blade in a direction of the taper to be formed in the slug and to effectuate the proper location of the cutting blade with respect to the workpiece.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
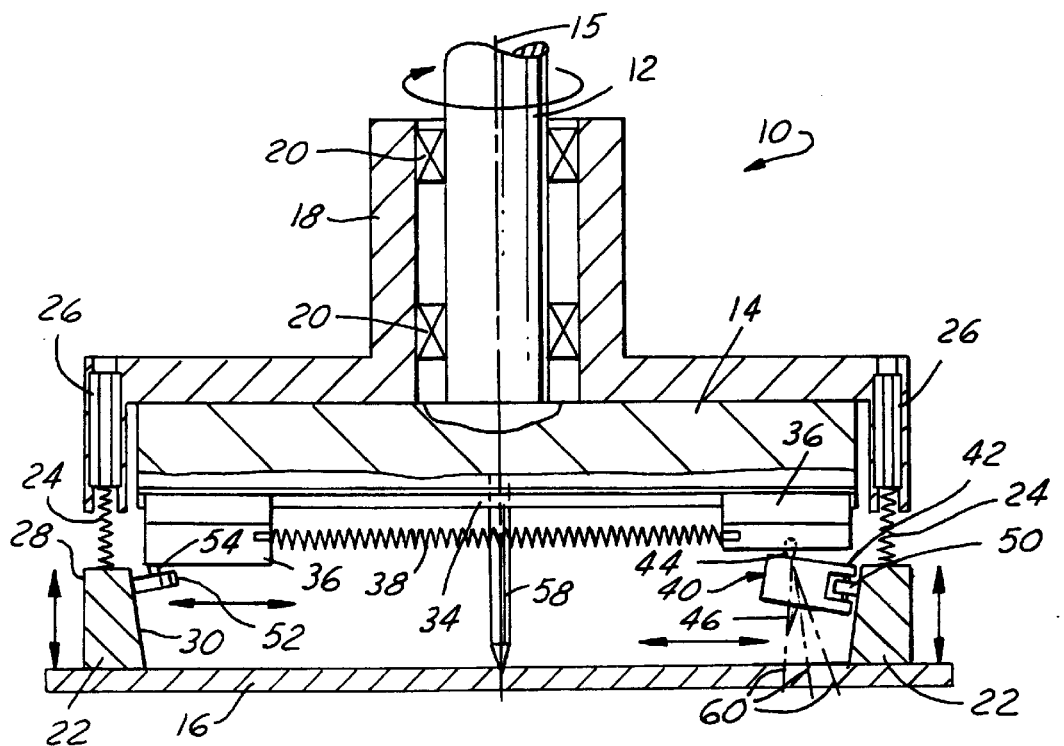
FIG. 1 is a cross-sectional view of a boring head for cutting non-uniform holes in a workpiece in accordance with a preferred embodiment of the present invention.
Figure 2:
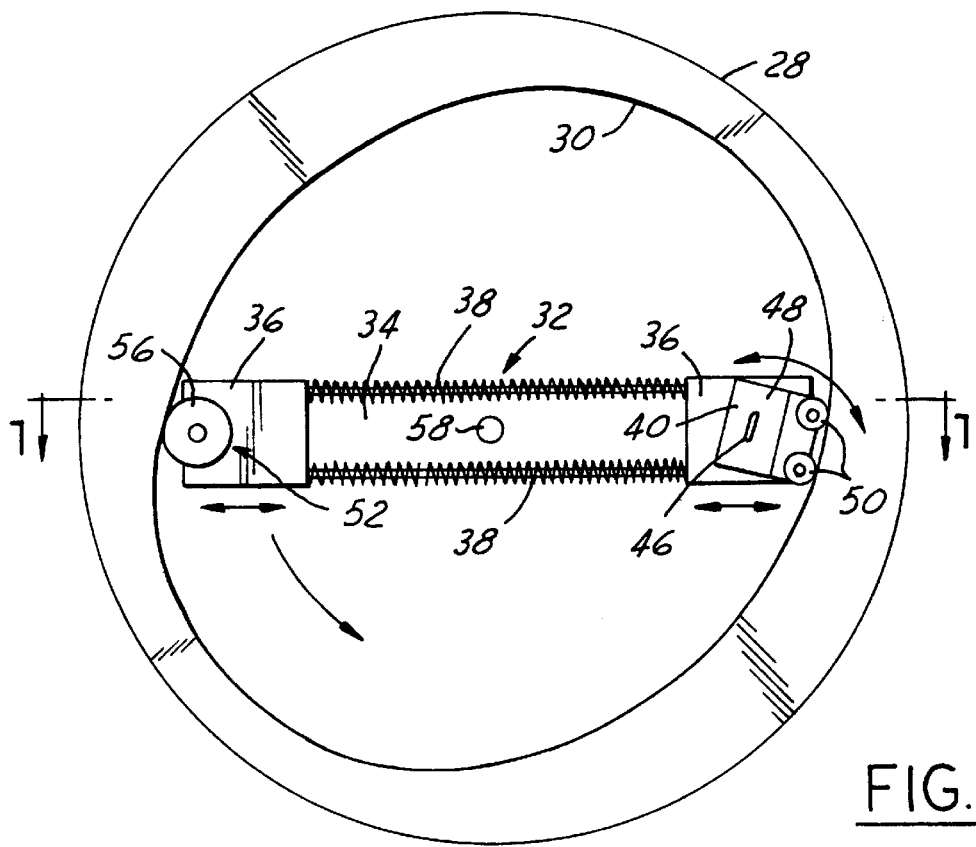
FIG. 2 is a plan view of a boring head for cutting non-uniform holes in a workpiece in accordance with the preferred embodiment of the invention as shown in FIG. 1.

FIGS. 1 and 2 illustrate a preferred mechanical cutting device 10, in accordance with a preferred embodiment of the present invention. The cutting device 10 includes a rotating mandrel or boring head shaft 12 that is attached to a boring head 14 and rotates about an axis 15. The boring head 14 is fixed to the boring head shaft 12 which is generally perpendicular to a workpiece 16 upon which the cutting device 10 is to act. The boring head 14 is preferably generally circular in shape, although, other shapes may be utilized.

The boring head shaft 12 and the boring head 14 are isolated from, but surrounded by, a stationary housing 18 by a pair of rotational bearings 20. The stationary housing 18 is in contact with a pattern template 22 that defines the pattern of the hole to be cut in the workpiece 16. The pattern template is preferably manufactured from a hardened steel to prevent wear, however, other materials may be used. The stationary housing 18 also serves to orient the pattern template 22 with respect to the workpiece 16. For the formation of round holes, which need no orientation, the housing 18 can be unsecured and free-floating. For non-circular or non-uniform holes, the pattern template 22 is preferably attached to the housing 18 by a plurality of springs 24 which are in communication with a respective thrust bearing 26 positioned within the housing 18. Alternatively, the pattern template 22 may be secured directly to the stationary housing 18.

The pattern template 22 has an outer periphery 28 that preferably matches the outer surface of the housing 18 and an inner periphery 30 that is generally tapered inward toward the axis 15 as the template 22 extends from the housing 18 toward the workpiece 16. A carrier portion 32 is preferably secured to the undersurface of the boring head 14 and rotates as the boring shaft 12 and the boring head 14 rotate. The carrier portion 32 includes a linear rail 34 secured directly to the boring head 14 and a pair of opposing end portions 38 that are slideable along the liner rail 34. The opposing end portions 36 are biased from one another by a pair of biasing springs 38 that urge the opposing end portions 36 outwardly toward the housing 18.

A secant following cutter 40 is pivotally fixed by a connector 44 at a top surface 42 to one of the linearly movable end portions 36. The connector 44 is positioned such that it is parallel to the cutting blade 46 to allow for a proper cut. The secant following cutter 36 has a cutting blade 46 secured therewithin that extends from the bottom surface 48 of the secant following cutter 36. The secant following cutter 36 includes a plurality of rotating rollers 50 that contact and follow the inner periphery of the pattern template 22, as discussed in more detail below. It should be understood that the term roller is being used generally to define any rotatable structure, such as a rotary bearing or the like. Further, the rollers 50 which contact the pattern template 22 are also constructed from a hardened material. The other opposing end portion 36 is pivotally connected to a force balancing cam follower 52 by a connector 54. The force balancing cam follower 52 is preferably comprised of a rotating wheel 56 that engages the inner periphery 30 of the pattern template 22.

As shown in FIG. 2, the shape of the hole to be cut in the workpiece 16 matches the cross-section of the inner periphery 30 and in this example is non-circular. The contact of the rotating wheel 56 of the force balancing cam follower 52 and the rollers 50 of the secant following cutter 40 track the inner periphery 30 of the pattern template 22 to guide the cutting blade 46. By tracking the inner periphery 30 of the pattern template 22, properly shaped holes are cut in the workpiece 16. The force balancing cam follower 52, which is coupled to and opposes the secant following cutter 40 via the linear bearings 36 and the springs 38, helps balance eccentric, off-axis forces due to the secant following cutter 32 and serves to minimize wobble of the cutting blade 46 due to possible material motion and excessive bearing wear.

In operation, the cutting tool 10 is lowered toward the surface of the workpiece 16 until the pattern template 22 contacts the surface of the workpiece 16, as shown in FIG. 1. The pattern template 22 begins to move upward relative to the housing 18 and the boring head 14 via a combination of the springs 24 and the bearings 26. If the pattern template 22 is instead fixed, the boring head 14 will move with respect to the housing 18. As the pattern template 22 moves relative to the boring head 14, the secant following cutter 40, also mounted with springs 38, linear bearings 36, and rotational bearings 44, will trace the inner periphery 30 of the template 22 and adjust the position of the cutting blade 46. To ensure proper tracing of the inner periphery 30 by the secant following cutter 40, the force balancing cam follower 52 is positioned on the opposing end portion 36 and also rides on the inner periphery 30. As the shape changes, the cam follower 52 will exert a force on the secant following cutter 40 via the springs 38 and the linear rail 34 to ensure proper positioning of the utility block 46.

The secant following cutter 40 forces the cutting blade 46 to approximate the tangent of the desired cut pattern by following a secant to the inner periphery 30 of the pattern template 22. The distance between the rollers 50 and the blade 46 can be adjusted to fine-tune the position of the cut relative to the template 22. In addition to being non-uniform (non-round), the pattern template 22 can also be tapered through its thickness to force the cutting blade 46 to move through the material at an angle. This permits a "pumpkin" like cut which prevents the resulting removed material from falling back into the bored hole. If the cutting blade 46 and the pattern template 22 are not angled, there is no need to move the cutting blade 46 in the radial direction. Therefore, the pattern template 22 can be rigidly fixed to the housing 18, with the cutting blade 46 secured in one position to cut through the material.

The boring head 14 can also be augmented by a material removal aid such as a slug pin 58 with plate-coupled ejector-pins, as discussed in more detail below. A vacuum assist device or the like may also be used to prevent the cut slug from falling through the cut hole into the workpiece 16. It should be understood that the number and configurations of the springs 38 may be varied as may the configuration of the linear rail 34 and the carrier portion 32. The design may vary so long as the secant following cutter 40 and the force balancing cam follower 52 are urged outwardly and into engagement with the inner periphery 30 of the pattern template 22.

The apparatus detailed above may be suitable for cutting multiple patterns, with only a change of the pattern template 22 and minor adjustments, thus providing flexible capabilities. As discussed above, the pattern template 22 and the cutting blade 46 can be angled so that the blade 46 passes through the material at an angle to the material, either a positive or negative angle to the vertical axis, as shown schematically by the dashed lines 60 in FIG. 1. As mentioned above, angling the cut can serve to generate a "pumpkin" like cut to prevent a boring slug from falling within the object being bored. A reverse "pumpkin" like cut can ensure that the boring slug falls through the device. Vertical cuts can be made with a vertical cutting blade 46 coupled with a non-tapered template 22. The angle of the cut to be made is generally unlimited and can range between −90 degrees and 90 degrees. However, the preferred range is between −45 degrees and 45 degrees.

Figure 3:
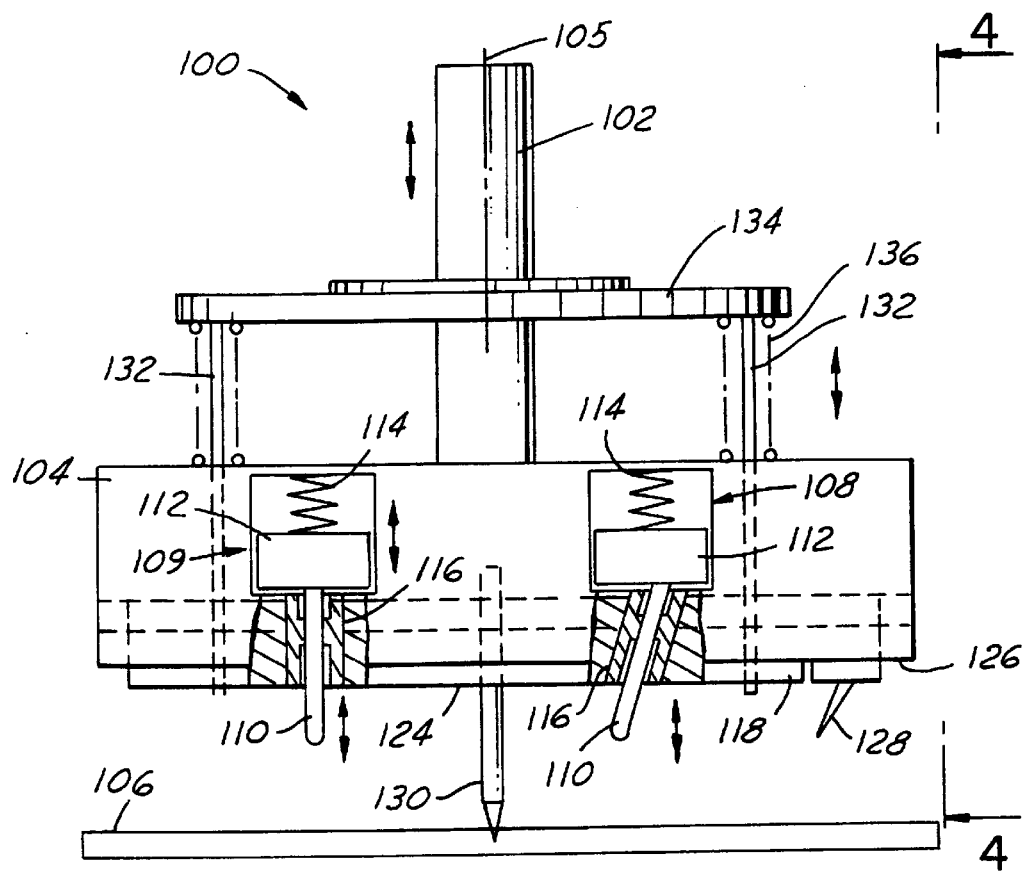
FIG. 3 is a cross-sectional view of a boring head for cutting tapered circular holes in a workpiece in accordance with another preferred embodiment of the present invention.
Figure 4:
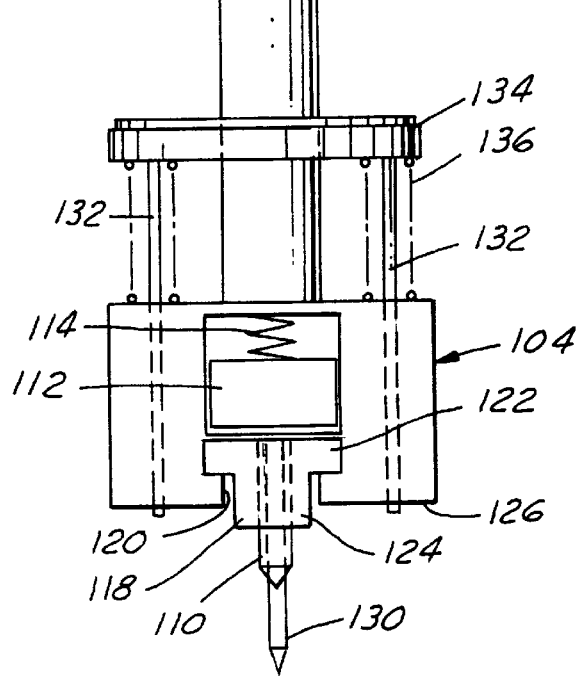
FIG. 4 is another cross-sectional view of the boring head for cutting tapered circular holes in a workpiece in accordance with the preferred embodiment of the invention as shown in FIG. 3.

Turning now to FIGS. 3 and 4 which illustrate another preferred embodiment of a cutting device 100 in accordance with the present invention. The cutting device 100 includes a boring head shaft 102 that is attached to a boring head 104. The boring head 104 is positioned on the boring head shaft 102 generally perpendicular to a workpiece 106 upon which the cutting device 100 is to act. The shape of the boring head 104 is generally rectangular with oval ends. However, the boring head 104 may be circular or any other shape. The boring head shaft 104 is rotatable about an axis 105.

The boring head 104 has a pair of surface probes 108, 109 disposed therein. The surface probe 108 is positioned on an angle while the surface probe 109 is positioned perpendicular to the boring head 104. The surface probes 108, 109 each consist of a guide pin 110 that is in communication with a linear guide 112. The linear guide 112 are biased downwardly by a respective guide spring 114 such that each of the guide pins 110 contact the surface of the workpiece 106. The guide pins 110 are each preferably surrounded by and moveable within a bushing 116 allowing the guide pins 110 and the surface probes 108, 109 to reciprocate therewithin. The guide pins 110 and the bushings 116 are in communication with a linear slide 118 that is disposed within a slot 120 in the boring head 104. As shown in the figures, the linear slide 118 is preferably T-shaped and has an upper portion 122 that retains the linear slide 118 in the slot 120 and a lower portion 124 that extends through the slot 120 and below the bottom surface 128 of the boring head 104.

A cutting blade 128 is disposed within the boring head 104 and extends beneath its bottom surface 126 to engage the workpiece 106. The blade 128 is preferably angled, as shown in FIG. 3, and also in communication with the linear slide 118 to move linearly with respect to the boring head 104. The blade 128 is preferably angled to form a taper or "pumpkin" like cut in the workpiece 106, as discussed above. Obviously, the angle of the blade 128 may be varied between −90 degrees and 90 degrees.

In operation, the surface probes 108, 109 contact the surface of the workpiece 106 and the surface probe 108 moves the cutting blade 128 in the direction of the taper at a preset function of the rate of the blade's motion perpendicular to the workpiece 106. The resultant motion of the cutting blade 128 is along the major axis of the blade 128 while rotating about the axis 105 of the boring head 104, at whatever angle is desired to create the tapered cut. The motion of the surface probe 108 is coupled to the motion of the cutting blade 128 via a combination of the linear slides 118, the springs 114, the bushings 116, the guide pin 110, and the linear guides. As the boring head 104 moves downward toward the surface of the workpiece 16, the surface probes 108, 109 and the cutting blade 128 are at the same level. The surface probes 108, 109 are held at the home position by the linear springs 114, and the tip of the cutting blade 128 is in the radial position of the outer diameter of the tapered hole.

As the surface probes 108, 109 contact the surface of the workpiece 106, their downward movement stops while the boring head 104 continues forward or downward. The relative motion between the surface probe 108 and the boring head 104 causes the linear slide 118 to actuate at a rate defined by the guide pin 110 and the angle of the bushing 116 designed into the mechanism. The surface probe 109 helps keep the workpiece properly aligned with respect to the cutting blade 128. The linear slide 118 carries the cutting blade 128 in the desired radial direction at a rate which is coupled to the boring head 104 to ensure that the cutting blade 128 moves through the workpiece 106 along its major axis. Once the workpiece 106 has been cut through, the slug can be removed from the hole by commonly used devices such as a slug pin 130.

Ejection of the slug from the slug pin 130 can also be accomplished with the use of common devices such as ejector pins 132. The ejector pins 132 are attached to a kick-off plate 134 and extend through the boring head 104. The kick-off plate 134 is biased from the boring head 104 by a plurality of springs 136. In the preferred embodiment, 4 springs 136 are utilized. After the slug has been cut and is retained on the slug pin 130, the kick-off plate 134 is forced downward against the force of the springs 136 such that the pins 132 contact the slug and force it off of the slug pin 130.

If the surface probes 108 are located within the perimeter of the bored slug, they will return to their home positions after ejection of the slug. If the surface probes 108, 109 are located outside the perimeter of the bored slug, they will return to their home positions along with the cutting blade 128 when the boring head 104 moves from the bored surface of the workpiece 106. In cases where the surface probes 108, 109 are in contact with the slug, and being that they are spring loaded, shaped slug pins 130 may be warranted to ensure that the slugs are retained with sufficient force to withstand the opposing push of the surface probes 108, 109. Spring forces and thrust angles of the mechanism must be chosen in conjunction with the taper angle of the cutting blade 128 to ensure optimal operation. Alternatively, the surface probes 108, 109 which are used primarily for force balancing can both be positioned perpendicular to the surface, and thus uncoupled from the actuation of the linear slide 118.

For additional robustness, particularly in contaminant rich environments, the slug ejection movement can also be utilized to aid in resetting the blade 128 and the surface probe 108 to its home position. The radial position of the blade 128 is adjustable so that the diameter of the bored hole can be precisely set. Further, while only one method has been specifically shown, many methods are available for converting the vertical motion of the surface probe 108 to the required radial motion of the blade 128, each with its own benefits for a particular situation.

While particular embodiments of the invention have been shown and described, numerous variations and alternate embodiments will occur to those skilled in the art. Accordingly, it is intended that the invention be limited only in terms of the appended claims.

What is claimed is:

1. An apparatus for forming a hole in a workpiece, comprising:
   a rotatable boring shaft in communication with a drive mechanism;
   a boring head secured to said boring shaft for rotating therewith and having a bottom surface, aligned generally parallel to the workpiece;
   a cutting blade that extends downwardly below said bottom surface of said boring head and is spaced away from an axis of rotation of said boring shaft, said cutting blade being angled with respect to said boring shaft axis of rotation as said blade enters the workpiece in order to cut a slug having a tapered edge;
   an alignment device for contacting the workpiece and aligning said cutting blade in order to cut out a slug of a predetermined shape in the workpiece; and
   a slug pin for piercing and retaining said slug after the hole has been formed in the workpiece.

2. The apparatus as recited in claim 1, further comprising: a housing disposed around said boring head.

3. The apparatus as recited in claim 2, wherein a pattern template is in communication with said housing and is disposed beneath said bottom surface of said boring head, said pattern template having an inner periphery and an outer periphery.

4. The apparatus as recited in claim 3, wherein said inner periphery is tapered toward said axis as it extends toward the workpiece for cutting slugs having tapered edges.

5. The apparatus as recited in claim 4, further comprising:
   a secant following cutter having at least one roller for contacting said inner periphery of said pattern template and having a bottom surface from which said cutting blade is secured; and
   a force balancing cam follower disposed opposite said secant following cutter to ensure accurate cutting of the hole in the workpiece.

6. The apparatus as recited in claim 5, wherein the holes formed in said workpiece are non-circular.

7. A mechanical tool for boring tapered holes in a workpiece through removal of a slug, comprising:
   a boring head shaft that is rotatable about an axis;
   a boring head attached to said shaft and having a bottom surface;
   a cutting blade extending beneath said bottom surface of said boring head for contacting the workpiece, said cutting blade being disposed away from and at an angle with respect to said axis;
   at least one surface probe for contacting the workpiece and moving said cutting blade in a direction of the taper to be formed in the slug; and
   a linear slide positioned within said boring head and in communication with said at least one surface probe and said cutting blade to effectuate the proper location of the cutting blade with respect to the workpiece.

8. The mechanical tool as recited in claim 7, further comprising a slug pin extending downwardly from said bore head for piercing and retaining said cut slug.

9. The mechanical tool as recited in claim 8, wherein said at least one surface probe includes a guide pin extending through said bottom surface of said boring head, a linear guide disposed within said bore head in communication with said guide probe, and a guide spring biasing said guide probe and said linear guide toward the workpiece.

10. The mechanical tool as recited in claim 9, further comprising:
    a bushing surrounding said guide probe to assist it in reciprocating.

11. The mechanical tool as recited in claim 8, further comprising:
    an ejector pin assembly to assist in removing said cut slug from said slug pin.

12. The mechanical tool as recited in claim 11, wherein said ejector pin assembly includes a knock-off plate biased from said boring head by at least one biasing spring.

13. The mechanical tool as recited in claim 7, wherein a pair of surface probes are utilized.

14. A cutting tool for forming non-circular holes in a workpiece, comprising:
    a boring head shaft that is rotatable about an axis;
    a boring head attached to said shaft and having a bottom surface;
    a stationary housing at least partially surrounding said boring head;
    a pattern template having an inner periphery and an outer periphery secured to said stationary housing;
    a linear rail secured to said bottom surface of said boring head;
    a secant following cutter slideable on said linear rail toward and away from said axis; and
    a cutting blade extending from said secant following cutter to form a hole in the workpiece.

15. A cutting tool as recited in claim 14, further comprising:
    a slug pin extending from said bottom surface of said boring head for piercing and retaining a slug cut from the workpiece to prevent it from falling through the hole formed therein.

16. A cutting tool as recited in claim 14, wherein said inner periphery of said pattern template is tapered inwardly toward said axis as it extends away from said bottom surface of said bore head.

17. A cutting tool as recited in claim 16, wherein said inner periphery has a cross-sectional shape that is non-uniform.

18. A cutting tool as recited in claim 17, wherein said secant following cutter has two rollers for engaging said inner periphery of said pattern template and is pivotable with respect to said linear rail to allow said cutting blade to cut shapes that are non-uniform in cross-section.

19. A cutting tool as recited in claim 18, further comprising:
    a force balancing cam follower positioned on said linear rail opposite said secant cam follower and being biased outwardly therefrom into contact with said inner periphery.

* * * * *